US011414037B2

(12) United States Patent
Elija (10) Patent No.: US 11,414,037 B2
(45) Date of Patent: Aug. 16, 2022

(54) AIRBAG FOR A VEHICLE OCCUPANT RESTRAINT SYSTEM

(71) Applicant: TRW AUTOMOTIVE GMBH, Alfdorf (DE)

(72) Inventor: Daniel Elija, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 16/641,766

(22) PCT Filed: Aug. 7, 2018

(86) PCT No.: PCT/EP2018/071403
§ 371 (c)(1),
(2) Date: Feb. 25, 2020

(87) PCT Pub. No.: WO2019/042723
PCT Pub. Date: Mar. 7, 2019

(65) Prior Publication Data
US 2020/0216007 A1    Jul. 9, 2020

(30) Foreign Application Priority Data
Sep. 4, 2017   (DE) .......................... 102017120238.2

(51) Int. Cl.
*B60R 21/203*    (2006.01)
(52) U.S. Cl.
CPC ................ *B60R 21/2035* (2013.01)
(58) Field of Classification Search
CPC ........................ B60R 21/231; B60R 21/2334
See application file for complete search history.

(56) References Cited

U.S. PATENT DOCUMENTS 8,696,020 B2 * 4/2014 Tanaka .................. B60R 21/233
280/730.1
10,632,953 B2 * 4/2020 Shigemura .......... B60R 21/2171
10,710,541 B2 * 7/2020 Shigemura ............ B60R 21/237
(Continued)

FOREIGN PATENT DOCUMENTS

DE    102014016163 A1 *  5/2016   .......... B60R 21/231
DE    102016118382 A1 *  3/2017   .......... B60R 21/231
(Continued)

*Primary Examiner* — Nicole T Verley
(74) *Attorney, Agent, or Firm* — Tarolli, Sundheim, Covell & Tummino LLP (57) ABSTRACT

The invention describes an airbag (10) for a vehicle occupant restraint system, wherein the airbag (10) in the inflated state includes a front side (24) forming an occupant impact surface and an opposite rear side (22). The front side (24) and the rear side (22) are formed by shell portions (14, 16) of the airbag (10) being connected to each other at their outer edges (34, 36). The front side (24) is longer along a centerline (M) extending in the longitudinal direction of the airbag (10) than the rear side (22) so that, in the inflated state, the airbag (10) takes a curved shape. The front side (24) has at least one shaping line (42) extending substantially curved and transversely to the centerline (M) at which shaping line two shell portions (34, 36) are connected to each other. The respective outer edges (34, 36) of the front side (24) and the respective outer edges (34, 36) of the rear side (22) are of the same overall length.

10 Claims, 4 Drawing Sheets

(56) References Cited

U.S. PATENT DOCUMENTS

| | | | |
|---|---|---|---|
| 11,083,455 B2 * | 8/2021 | Shelton, IV | A61B 17/07207 |
| 11,083,456 B2 * | 8/2021 | Shelton, IV | A61B 17/105 |
| 2003/0173759 A1 | 9/2003 | Grenier | |
| 2009/0058052 A1 * | 3/2009 | Ford | B60R 21/2171 |
| | | | 280/730.1 |
| 2009/0085333 A1 * | 4/2009 | Imaeda | B60R 21/2032 |
| | | | 280/730.1 |
| 2011/0260434 A1 * | 10/2011 | Gottschalk | B60R 21/231 |
| | | | 280/730.2 |
| 2013/0020787 A1 | 1/2013 | Abele et al. | |
| 2013/0093168 A1 | 4/2013 | Przybysz et al. | |
| 2016/0176379 A1 * | 6/2016 | Freisler | B60R 21/231 |
| | | | 280/730.1 |
| 2017/0008477 A1 * | 1/2017 | Luna Nell | B60R 21/205 |
| 2018/0029557 A1 * | 2/2018 | Yamada | B60R 21/2338 |
| 2020/0010040 A1 * | 1/2020 | Nakamura | B60R 21/01554 |
| 2020/0023804 A1 * | 1/2020 | Weiss | B60R 21/231 |
| 2021/0245700 A1 * | 8/2021 | Haenel | B60R 21/207 |

FOREIGN PATENT DOCUMENTS

| | | | | |
|---|---|---|---|---|
| DE | 102015012700 | | 4/2017 | |
| EP | 1179457 | | 2/2002 | |
| EP | 2042387 A1 * | | 4/2009 | B60R 21/206 |
| JP | 2002002433 | | 1/2002 | |
| JP | 2017047744 A * | | 3/2017 | B60R 21/206 |
| WO | WO-0100456 A1 * | | 1/2001 | B60R 21/18 |
| WO | WO-2014168364 A1 * | | 10/2014 | B60R 21/233 |
| WO | WO-2015015912 A1 * | | 2/2015 | B60R 21/233 |
| WO | 2015173116 | | 11/2015 | |
| WO | WO-2017140521 A1 * | | 8/2017 | B60R 21/231 |

* cited by examiner

AIRBAG FOR A VEHICLE OCCUPANT RESTRAINT SYSTEM

RELATED APPLICATIONS

This application corresponds to PCT/EP2018/071403, filed Aug. 7, 2018, which claims the benefit of German Application No. 10 2017 120 238.2, filed Sep. 4, 2017, the subject matter of which are incorporated herein by reference in their entirety.

BACKGROUND OF THE INVENTION

The invention relates to an airbag for a vehicle occupant restraint system, especially a so-called knee airbag.

From prior art, airbags are known for use in an automotive vehicle to protect a vehicle occupant in the area of his/her knee, for example. Airbags of this type are also referred to as knee airbags. Usually two different types of configuration of knee airbags are differentiated in which the airbags are arranged in the visible area and, resp., in the hidden area inside the automotive vehicle. In the knee airbags arranged in the visible area a visual cover is provided, for example, which, as a rule, is disposed beneath the steering wheel lining on the driver side and, resp., beneath the glove box on the passenger side. The knee airbags arranged in the hidden area are arranged, for example, beneath or behind an instrument panel.

In knee airbags arranged in the hidden area and, resp., in the corresponding airbag modules, the airbag must deploy upwards about the lower edge of the instrument panel to efficiently protect the vehicle occupant, especially in the area of his/her knee. Accordingly, in the inflated state the airbag takes a curved shape which extends starting from the hidden area beneath or behind the instrument panel around the instrument panel. In order to influence the inflation behavior of the airbag in a desired manner, the airbag requires specific control mechanisms.

In prior art, this is usually achieved by designing the rear side of the airbag in the inflated state to be shorter than the front side, with the length of the rear side being shortened by providing a fabric gathering on the rear side causing the at least one shell portion of the airbag forming the rear side to be partly gathered.

It has turned out to be a drawback that manufacture is complicated as a separate manufacturing step is required to produce the fabric gathering. In addition, higher manufacturing costs are incurred due to the additional manufacturing step and the additionally used material. Furthermore, a higher limit of accuracy must be observed during manufacture to ensure the airbag to deploy in a desired manner. Moreover, the folded airbag requires a larger construction space due to the fabric gathering, as fabric accumulates in the area of the fabric gathering.

SUMMARY OF THE INVENTION

It is the object of the invention to provide an airbag for a vehicle occupant restraint system which can be used especially as a knee airbag, wherein the latter requires little space and can be manufactured at low cost.

According to the invention, the object is achieved by an airbag for a vehicle occupant restraint system, wherein, in the inflated state, the airbag has a front side forming an occupant impact surface and an opposite rear side, the front side and the rear side being formed by shell portions of the airbag which are connected to each other at their outer edges, with the front side along a centerline extending in the longitudinal direction of the airbag being longer than the rear side so that in the inflated state the airbag takes a curved shape, the front side exhibiting at least one shaping line extending substantially curved and transversely to the centerline at which shaping line two shell portions are connected to each other, wherein the respective outer edges of the front side and the respective outer edges of the rear side exhibit the same overall length.

It is the basic idea of the invention to manufacture the airbag in a more space-saving and thus simpler manner by dispensing with the rear fabric gathering. Accordingly, the required construction space of the folded airbag can be reduced. In addition, the material required for the additional fabric gathering as well as the additional mounting and, resp., manufacturing step can be saved. Since the respective outer edges, i.e. the outer contour, of the front side and the rear side are equal, it is ensured that the respective outer edges can be stitched to each other free from creases.

The substantially curved shaping line extends on the front side facing the vehicle occupant, wherein the shaping line extends transversely, when viewed in the vehicle direction. The shaping line separates or, resp., defines different chambers within the three-dimensionally designed airbag, especially as regards the size and/or shape. The substantially curved extension of the shaping line on the front side is defined already by three points, for example two points in the area of the outer edges and one point in the area of the centerline. If a shaping line shows a curvature across said three points, a substantially curved extension of the shaping line is given.

One aspect provides that the airbag is designed free from gathering. Accordingly, it is ensured for a knee airbag that it inflates in a desired manner and thus takes a curved shape in the inflated state. Accordingly, a fabric gathering for controlling the inflation behavior, especially a fabric gathering on the rear side, can be dispensed with.

According to another aspect, the shell portions are formed by separately designed shell parts. The airbag, especially the cut thereof, is thus formed in several parts. The individual shell parts are stitched to each other to design the shape of the airbag. Accordingly, the shaping line extending substantially curved and transversely to the centerline can be produced.

As an alternative, the airbag is made from one single shell part. The shell part may comprise several shell portions which are formed, for example, by seams and/or folding. The one shell part thus can be folded so that appropriate shell portions which are fixed by seams will be formed. The shaping line extending substantially curved and transversely to the centerline can be formed at least in portions by a seam. For example, the shaping line extends along a folding and at least one seam.

Another aspect provides that the two shell portions have an edge contour that safeguards the respective outer edges of the front side and the respective outer edges of the rear side to be of the same overall length. If the shell portions are formed by separate shell parts, each of the latter exhibits an edge contour which is recessed toward the outer edges to ensure that the respective outer edges of the front and rear sides are in concurrent as to length.

The edge contour recessed toward the outer edges can be realized by removing fabric material, with the removed fabric material corresponding to the otherwise provided fabric gathering.

If one single shell part is present, the respective shaping line extends in such curved manner that the respective outer edges of the front side and the respective outer edges of the rear side are of the same overall length. Accordingly, the seam extends in a recessed manner relative to the outer edges. The seam being recessed at the outer edges defines excessive fabric material, i.e. the fabric material from the seam to the edge, with the excessive fabric material corresponding to the fabric material otherwise provided for fabric gathering.

In general, the respective front-side shell portions which are interconnected via the shaping line thus are designed so that the outer edges of the front side and those of the rear side are equal in the overall length.

According to one embodiment, at least one of the shell portions in the cut has an edge contour extending substantially convexly and transversely to the centerline. This ensures the respective shell portion to be formed recessed vis-à-vis its central area in the area of its outer edges.

In particular, the edge contour extending substantially transversely to the centerline has plural subareas taking different shapes. Accordingly, the edge contour may exhibit a particular geometry ensuring that, on the one hand, the front side along a centerline extending in the longitudinal direction of the airbag is longer than the rear side and, on the other hand, the respective outer edges of the front and rear sides are equal in the overall length.

Especially, the subareas have a straight, substantially convex and/or substantially concave design. Accordingly, the subareas may be formed differently, for example opposed, to ensure that the edge contour of the respective shell portions extending transversely to the centerline which are interconnected via the shaping line takes the desired shape. In this way, it is ensured that the outer edges of the airbag can be stitched to each other free from creases, as the outer edges are equal in length.

According to another embodiment, the edge contour extending substantially transversely to the centerline has a continuous geometry. The continuous geometry is defined by the fact that it can be described by a steady function which can especially be differentiated. For example, especially such edge contour has no plural subareas of different shape. The continuous geometry of the edge contour can be subdivided into different subareas, however.

Especially, the edge contour extending transversely to the centerline is arc-shaped. This ensures the respective shell portion to take a shape that is recessed vis-à-vis its central area in its outer edge zones.

Another aspect provides that the at least one shaping line extending substantially curved and transversely to the centerline is formed at least partially by a seam. The seam may be provided at the single shell part to configure the different shell portions. The seam also may be provided in part only, if the fabric material of the corresponding shell part is folded, for example. Furthermore, shell parts designed separately from each other can be connected to each other via the seam.

According to another aspect, the two shell portions are stitched to each other in the area of the edge contour extending substantially transversely to the centerline, especially wherein the seam at least partially forms the shaping line. Thus, the respective shell portions are designed via a seam. If the airbag is made from plural shell parts, the shaping line, viz. the seam forming the shaping line, extends in the area of the corresponding edge contours of the shell parts.

If the airbag is made from one single shell part, the seam extends in a defined area to configure the shell portions in a desired way. The shaping line may be produced by the seam and a folding.

According to one embodiment, the seam extends substantially in parallel to the edge contour. As a consequence, the spaces of the seam are substantially equal to the corresponding edge contour.

Another embodiment provides the seam to extend independently of the edge contour. Consequently, the seam may take a shape extending substantially convexly and transversely to the centerline with respect to the edge contour.

The seam may include several partial seam portions which take different shapes. For example, the partial seam portions are straight, substantially convex and/or substantially concave.

BRIEF DESCRIPTION OF THE DRAWINGS

Further advantages and characteristics of the invention will be evident from the following description and the drawings which will be referred to and wherein.

DESCRIPTION

Figure 1:
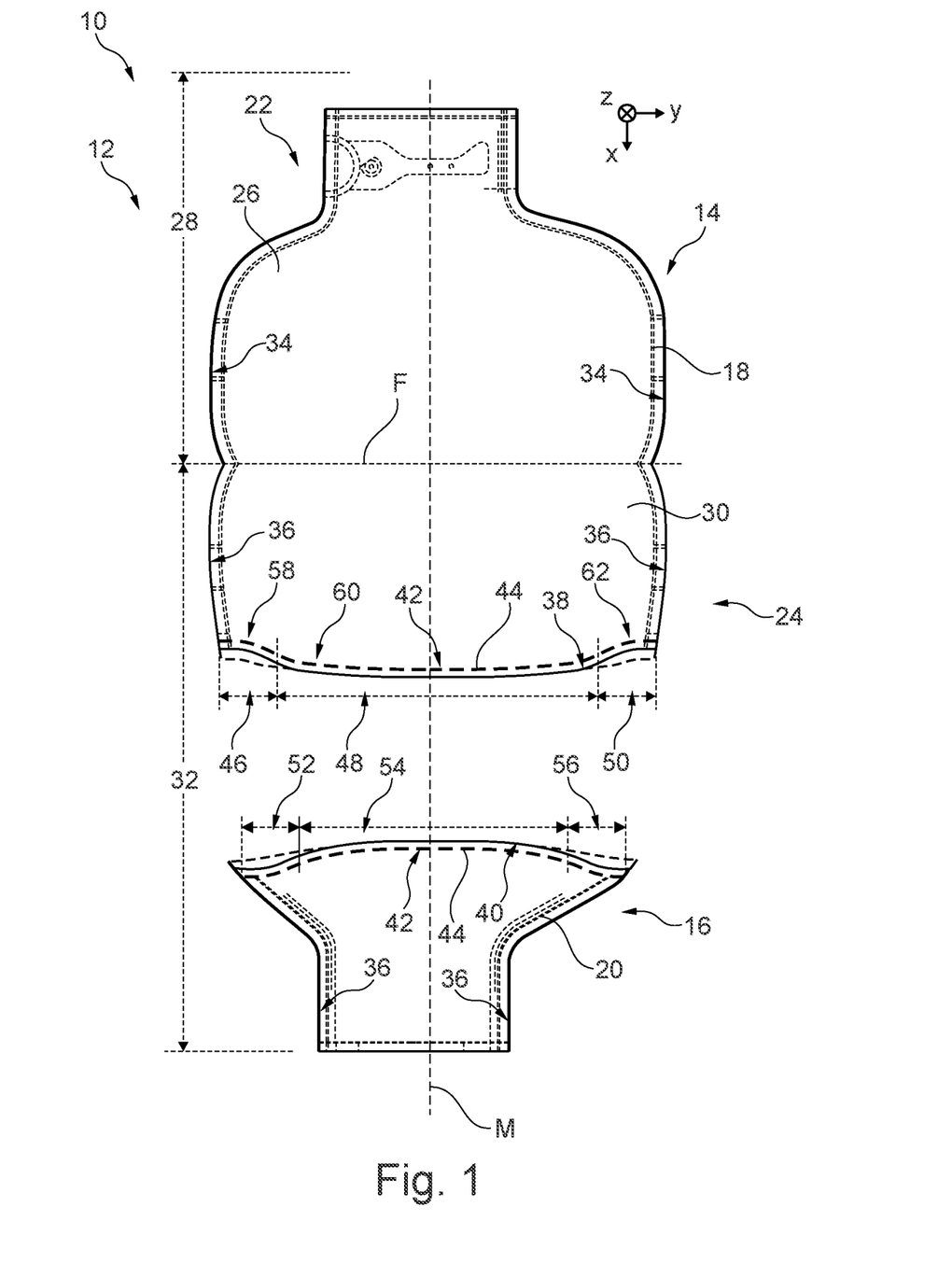
FIG. 1 shows a schematic view of a cut of an airbag according to the invention as set forth in a first embodiment.

FIG. 1 illustrates an airbag 10 in the non-stitched state which can be used as a knee airbag. The airbag 10 is part of a vehicle occupant restraint system in an automotive vehicle for the protection of a vehicle occupant. Usually, the airbag 10 together with an inflator not shown here constitutes an airbag module.

Since the airbag 10 is illustrated in the non-stitched state, a corresponding cut 12 of the airbag 10 is shown which, in the illustrated embodiment, consists of two shell portions 14, 16 formed by separately configured shell parts 18, 20.

The first shell portion 14 in the illustrated embodiment forms a rear side 22 of the airbag 10 in the inflated state. In addition, the first shell portion 14 partly forms a front side 24 of the airbag 10 in the inflated state. Accordingly, the first shell portion 14 includes a rear side face 26 forming a first area 28 of the cut 12 and a partial front side face 30 which, together with the second shell portion 16, forms the front side 24 of the airbag 10 in the inflated state. The partial front side face 30 and the second shell portion 16 together constitute a second area 32 which is formed by the two shell parts 18, 20 in the shown embodiment.

As a consequence, the first area 28 corresponds to the rear side 22 of the airbag 10, whereas the second area 32 corresponds to the front side 24 of the airbag 10.

In general, the front side 24 of the airbag 10 provides, in the inflated state thereof, an occupant impact surface via which especially at least one knee of the vehicle occupant is protected.

In FIG. 1, a folding line F is shown in a broken line located between the two areas 28, 32. Along the folding line F the first shell portion 14 is folded to design the cut 12 such that it can be stitched so as to form the (three-dimensional) airbag 10. A centerline M defining the longitudinal direction of the first shell portion 14 and the second shell portion 16 is perpendicular to said folding line F.

The two shell portions 14, 16 are configured such that the rear side 22 of the airbag 10 in the joined state has a smaller length than the front side 24 in the area of the centerline M, thus ensuring that the airbag 10 in the inflated state inflates around an instrument panel. Therefore, the airbag 10 in the inflated state takes a curved shape, viz. in the z direction.

Further, it can be seen from FIG. 1 that the cut 12 is configured so that outer edges 34 of the rear side 22 as well as outer edges 36 of the front side 24 formed by the partial front side face 30 and the second shell portion 16 are of the same overall length.

This means that, when folding the partial front side face 30 and, resp., when folding the first shell portion 14 about the folding line F, it is ensured that the corresponding outer edges 34, 36 are superimposed free from creases so that they can be easily joined by stitching.

Each of the two shell portions 14, 16 formed by separately formed shell parts 18, 20 moreover includes an edge contour 38, 40 via which the two shell portions 14, 16 are connected to each other.

The two shell portions 14, 16 are joined by stitching along a shaping line 42 so that a corresponding seam 44 is formed, when the two shell portions 14, 16 are connected to each other. The shaping line 42 defines chambers within the three-dimensional airbag 42.

The thus formed shaping line 42 is therefore located on the front side 24 of the airbag 10, with the shaping line 42 extending substantially transversely to the centerline M, as is evident from FIG. 1. Further, the shaping line 42 does not extend in a straight way, but in a substantially curved way and thus in the y direction.

In general, the shaping line 42 as well as the edge contours 38, 40 extend substantially in parallel to the folding line F, viz. substantially transversely to the centerline M.

In the shown embodiment, both the shaping line 42 and, resp., the seam 44 and the edge contours 38, 40 are designed so that they are recessed in the outer edge zones, the areas close to the outer edges 36, vis-à-vis the central area, viz. vis-à-vis the area along the centerline M.

This guarantees that the respective outer edges 34, 36 of the rear and front sides 22, 24 coincide so that the cut 12 can be stitched free from creases at the outer edges 34, 36 in the folded state to design the airbag 10. At the same time, the front side 24 is longer than the rear side 22 in the area of the centerline M so that the desired inflation behavior is resulting.

Each of the respective edge contours 38, 40 of the two shell portions 14, 16 has several subareas 46 to 56. The first edge contour 38 of the first shell portion 14 correspondingly has three subareas 46 to 50, whereas the second edge contour 40 of the second shell portion 16 equally comprises three subareas 52 to 56. The respective subareas 46 to 56 are formed in pairs corresponding to each other.

In total, the two edge contours 38, 40 have a substantially convex shape. The respective subareas 46 to 56 are differently designed, however, so that they take different shapes.

For example, the subareas 46, 50, 52, 56 located toward the respective outer edges 36 take a shape that ensures the fabric material to be recessed in these areas vis-à-vis the central areas of the first shell portion 14 and the second shell portion 16. The fact that the fabric material is recessed in the subareas 46, 50, 52, 56 is resulting from the surfaces formed between the edge in the subareas 46, 50, 52, 56 and the broken lines which constitute steady extensions of the subareas 48, 54.

This ensures that the outer edges 34, 36 of the two shell portions 14, 16 coincide, viz. have the same overall length. Moreover, it is ensured that the rear side 22 is shorter than the front side 24 as far as the length along the centerline M is concerned, which safeguards the desired inflation behavior.

Concretely speaking, the subareas 46, 50, 52, 56 located in the area of the respective outer edges 36 take a concave shape, whereas the other subareas 48, 54 take a convex shape. Since, however, the subareas 48, 54 are predominant, the two edge contours 38, 40 substantially take a convex shape.

The shaping line 42 and, resp., the seam 44 in the illustrated embodiment extends in parallel to the edge contours 38, 40 so that also the shaping line 42 and, resp., the seam 44 has plural partial seam portions 58 to 62. The first partial seam portion 58 is assigned to the subareas 46, 52, the second partial seam portion 60 is assigned to the subareas 48, 54 and the third partial seam portion 62 is assigned to the subareas 50, 65, as is illustrated in FIG. 1.

In this respect, each of the first and third partial seam portions 58, 62 takes a concave shape, whereas the second partial seam portion 60 takes a convex shape. In total, the seam 44 and, resp., the shaping line 42 takes a substantially convex shape.

In FIGS. 2 to 8, further embodiments are shown in which merely the second area 32 and thus the one defining the front side 24 is illustrated.

The edge contours 38, 40 and/or the shaping line 42 and, resp., the seam 44 in these embodiments, especially the subareas 46 to 56 and, resp., the partial seam portions 58 to 62, exhibit different shapes.

Figures 2, 3:
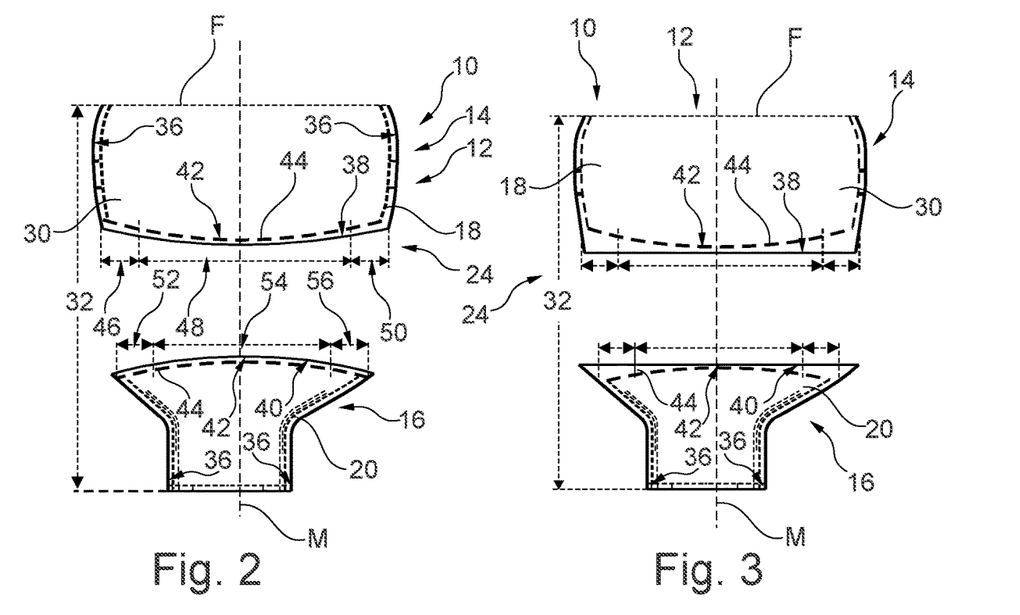
FIG. 2 shows a partial view of a cut of an airbag according to the invention as set forth in a second embodiment.
FIG. 3 shows a partial view of a cut of an airbag according to the invention as set forth in a third embodiment.

FIG. 2 illustrates, for example, that the edge contours 38, 40 have a continuous geometry. Consequently, the subareas 46 to 56 are configured so that the corresponding edge contours 38, 40 can be described by a steady, especially differentiable, function. This is equally applicable to the shaping line 42 and, resp., the seam 44 and the corresponding partial seam portions 58 to 62, as the shaping line 42 and, resp., the seam 44 extends in parallel to the edge contours 38, 40.

FIG. 3 illustrates an embodiment in which merely the shaping line 42 and, resp., the seam 44 shows a continuous geometry so that the partial seam portions 58 to 62 can be described by a steady, especially differentiable, function. The edge contours 38, 40, on the other hand, are straight so that fabric material projects from the corresponding edge zones. Said projecting fabric material may also be referred to as excessive fabric material which, in terms of quantity, corresponds to the fabric material which otherwise would have been used for the fabric gathering on the rear side 22.

In the embodiments according to FIGS. 2 and 3, the shaping line 42 and, resp., the seam 44 are designed to be substantially curved on the front side 24 of the airbag 10.

Figure 4:
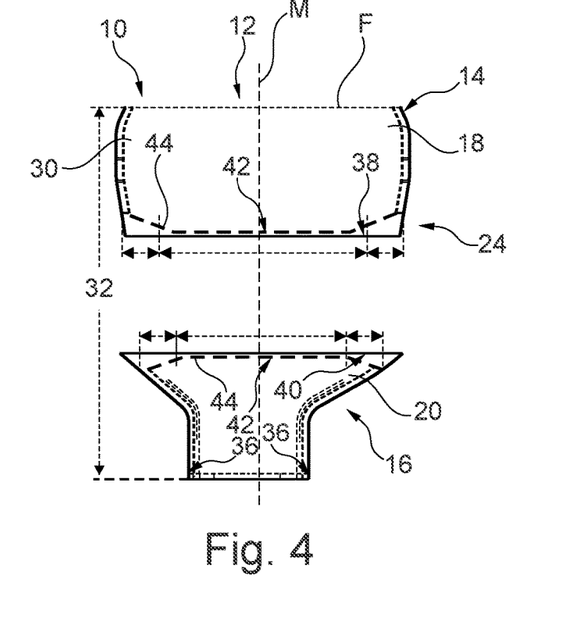
FIG. 4 shows a partial view of a cut of an airbag according to the invention as set forth in a fourth embodiment.

The embodiment according to FIG. 4 differs from the one from FIG. 3 to the effect that the shaping line 42 and, resp., the seam 44 is formed by straight partial seam portions 58 to 62. The respective partial seam portions 58 to 62 are arranged at an angle with each other, especially in mirror-symmetry to the centerline M. Therefore, a substantially curved shaping line 42 and, resp., seam 44 is resulting, as the two partial seam portions 58, 62 facing the edge zones extend to be recessed vis-à-vis the central partial seam portion 60.

In general, thus the fabric material of a respective shell portion 14, 16 extending to the shaping line 42 and, resp., seam 44 is decisive. In the area of the centerline M, the fabric material has a larger length up to the shaping line 42 and, resp., seam 44 than in the edge zones provided in the area of the corresponding outer edges 36.

Figure 5:
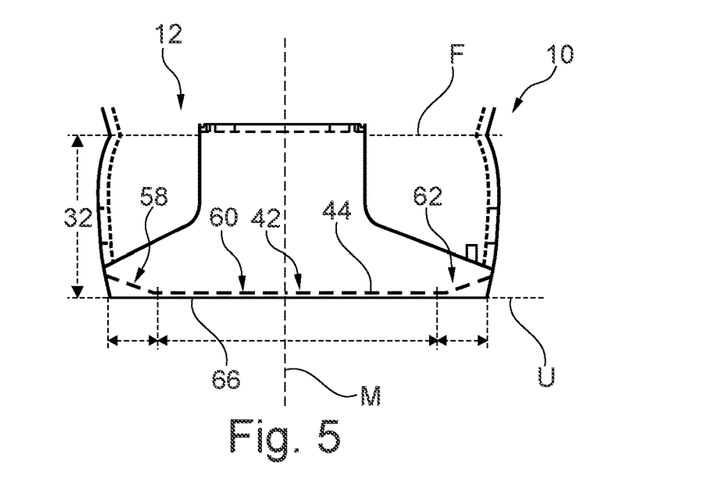
FIG. 5 shows a partial view of a cut of an airbag according to the invention as set forth in a fifth embodiment.
Figure 6:
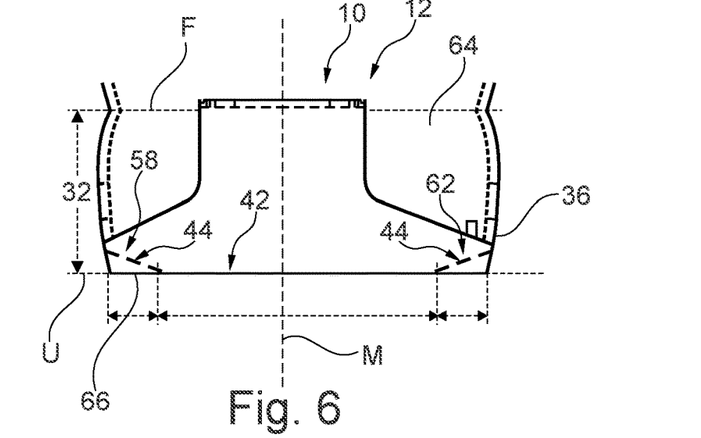
FIG. 6 shows a partial view of a cut of an airbag according to the invention as set forth in a sixth embodiment.
Figure 7:
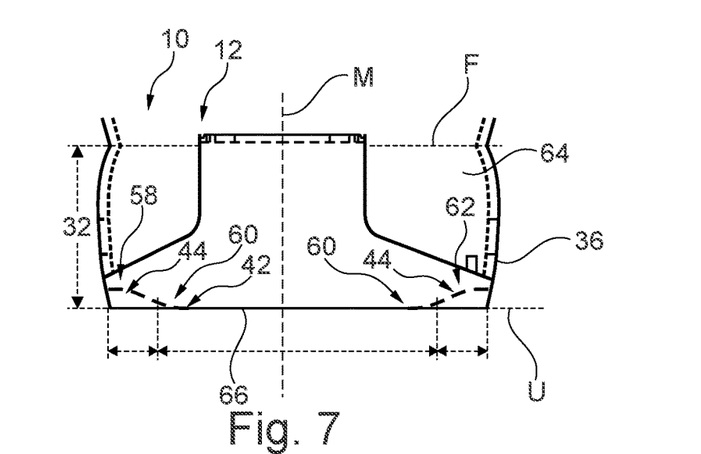
FIG. 7 shows a partial view of a cut of an airbag according to the invention as set forth in a seventh embodiment.

FIGS. 5 to 7 illustrate further embodiments which are different from those of the FIGS. 1 to 4 in that the two shell portions 14, 16 are formed by one single shell part 64 which is folded along a folding line U to form the two shell portions 14, 16. The single shell part 64 is thus folded along the folding line U so that a folding 66 is formed. The folding at least partially constitutes the shaping line 42.

Accordingly, the folding 66 substantially corresponds to the first edge contour 38 of the first shell portion 14 as set forth in the embodiment shown in FIG. 4, with the airbag 10 being already gastight in the area of the folding 66.

In the embodiment according to FIG. 5, the seam 44 extends analogously to that of FIG. 4.

The embodiments according to FIGS. 6 and 7 substantially correspond to those of the FIGS. 5 and 1, with the seam 44 being provided only partially, as it runs into the folding 66 and thus directly into the folded edge. In these embodiments, the shaping line 42 is thus formed by the seam 44 and the folding 66.

In the embodiment shown in FIG. 6, merely the partial seam portions 58, 62 are shown as compared to the embodiment according to FIG. 5, as the central partial seam portion 60 would coincide with the folding 66.

In the embodiment shown in FIG. 7, the central partial seam portion 60 is configured merely partially in the transition area to the partial seam portions 58, 62, until the central partial seam portion 60 runs into the folding 66.

As is evident from FIGS. 1 to 7, the shaping line 42 is always configured substantially transversely to the centerline M as well as in curved shape, as the shaping line 42 is recessed in the edge zones, viz. at the outer edges 36, vis-à-vis the central area at the centerline M.

The shaping line 42 can be formed completely by the seam 44, as illustrated in the embodiments according to FIGS. 1 to 5, or partially by the seam 44 and the folding 66.

In general, the shaping line 42 thus comprises a contour through which the outer edges 34, 36 of the rear and front sides 22, 24 are ensured to be equal in length and the front side 24 nevertheless is ensured to be longer than the rear side 22 in the area of the centerline M, which results in the desired inflation behavior of the airbag 10.

Especially, this is achieved by at least the partial seam portions 58, 62 which run into the outer edges 36 of the front side 24, wherein the partial seam portions 58, 62 ensure the shaping line 42 in the area of the outer edges 36 to run back vis-à-vis the central area at the centerline M. Hence, the partial seam portions 58, 62 run away from the folding 66 and, resp., from the corresponding edge contour 38, 40 in the area of the outer edges 36. This results in the substantially curved shape of the shaping line 42 on the front side 24.

Figure 8:
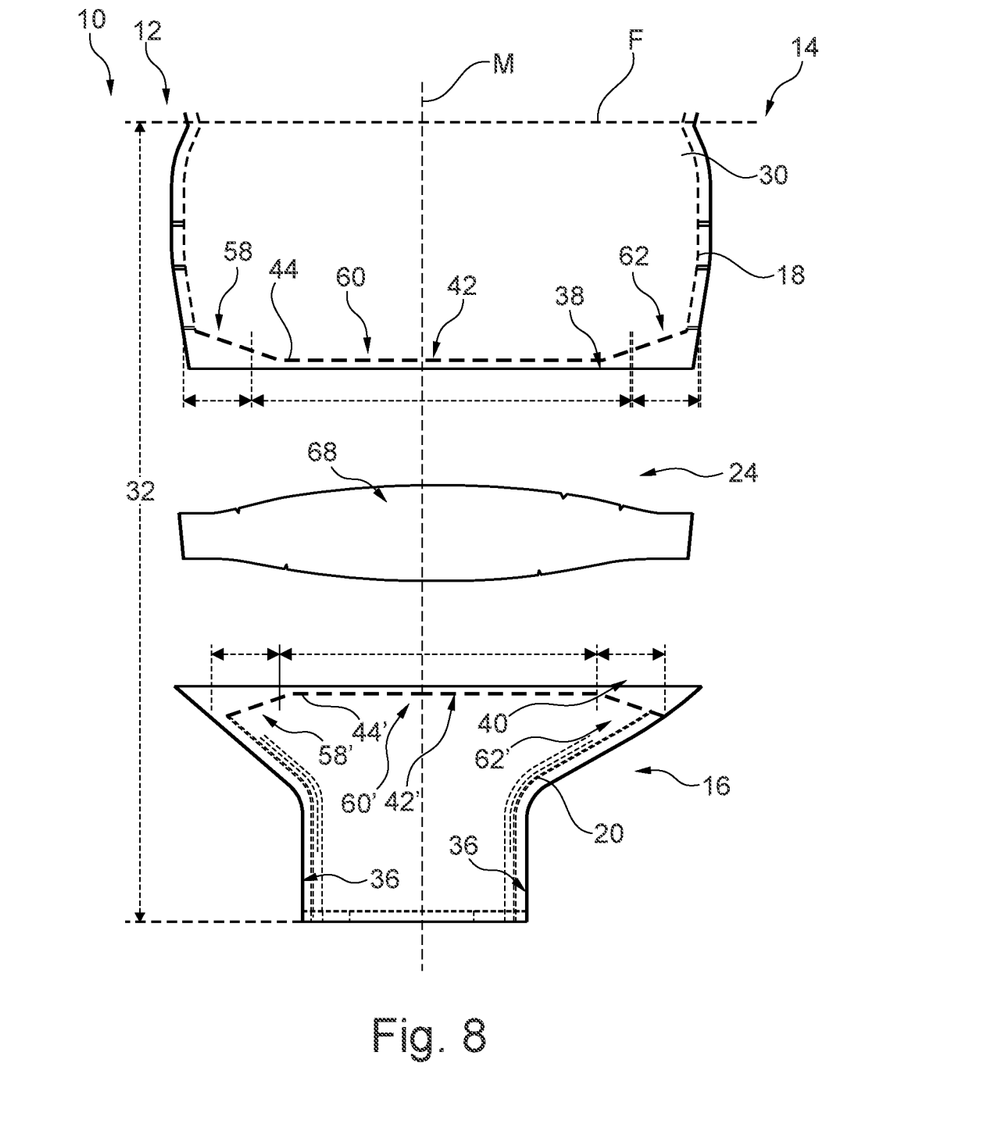
FIG. 8 shows a partial view of a cut of an airbag according to the invention as set forth in an eighth embodiment.

In FIG. 8, another embodiment is illustrated which differs from the other embodiments by the fact that the airbag 10 and, resp., the cut 12 has a third shell part 68 in the form of an insert which is interposed between the two shell parts 18, 20.

In the shown embodiment, the edge contours 38, 40 as well as the seam runs of the two shell parts 18, 20 are formed analogously to those of the shell parts 18, 20 according to FIG. 4. The third shell part 68 serving as an insert is configured to be appropriately corresponding.

Also, further inserts may be provided so that the airbag 10 can be formed of more than three shell parts. The individual shell parts are connected to each other via corresponding shaping lines 42 which therefore are connecting lines.

In general, the shapes of the seams 44 may be provided to be interchangeable, in particular the shapes of the seams 44 of the embodiments according to FIGS. 1 to 4 can be applied to the other embodiments.

Generally, an airbag 10 is provided which can be used as a knee airbag and requires little construction space, wherein the airbag 10 moreover can be manufactured at low cost. Since the airbag 10 can be used as knee airbag, the inflation behavior thereof can thus be controlled in a desired manner.

The invention claimed is:

1. A knee airbag (10) for a vehicle occupant restraint system, wherein the knee airbag (10) has an occupant impact surface forming front side (24) and an opposite rear side (22), the front side (24) and the rear side (22) being formed by shell portions (14, 16) of the knee airbag (10) which are connected to each other at their outer edges (34, 36), wherein the front side (24) along a centerline (M) extending in the longitudinal direction of the knee airbag (10) is longer than the rear side (22), wherein the front side (24) includes at least one shaping line (42) extending substantially curved and transversely to the centerline (M) at which shaping line two shell portions (14, 16) are connected to each other, wherein the respective outer edges (34, 36) of the front side (24) and the respective outer edges (34, 36) of the rear side (22) are of the same overall length.

2. The knee airbag (10) according to claim 1, wherein the shell portions (14, 16) are formed by separately configured shell parts (18, 20).

3. The knee airbag (10) according to claim 1, wherein the two shell portions (14, 16) include an edge contour (38, 40) which safeguards the respective outer edges (36) of the front side (24) and the respective outer edges (34) of the rear side (22) to have the same overall length.

4. The knee airbag (10) according to claim 1, wherein at least one of the shell portions (14, 16) in a cut (12) includes an edge contour (38, 40) extending substantially convexly and transversely to the centerline.

5. The knee airbag (10) according to claim 4, wherein the edge contour (38, 40) extending substantially transversely to the centerline (M) includes plural subareas (46-56) which are different in shape.

6. The knee airbag (10) according to claim 5, wherein the subareas (46-56) are formed to be straight, substantially convex and/or substantially concave.

7. The knee airbag (10) according to claim 4, wherein the edge contour (38, 40) extending substantially transversely to the centerline (M) exhibits a continuous geometry and is arc-shaped.

8. The knee airbag (10) according to claim 1, wherein the at least one shaping line (42) which extends substantially curved and transversely to the centerline (M) is formed at least partially by a seam (44).

9. The knee airbag (10) according to claim 1, wherein the two shell portions (14, 16) are joined by stitching in the area of the edge contour (38, 40) extending substantially transversely to the centerline (M), and wherein the seam (44) at least partially constitutes the shaping line (42).

10. The knee airbag (10) according to claim 8, wherein the seam (44) includes plural partial seam portions (58-62) being different in shape.

\* \* \* \* \*